United States Patent [19]

Drum

[11] 4,034,638

[45] July 12, 1977

[54] CIRCULAR SAW HAVING REDUCED NOISE

[75] Inventor: Perry B. Drum, Lenoir, N.C.

[73] Assignee: McCrary Saw & Tool Company, Lenoir, N.C.

[21] Appl. No.: 709,589

[22] Filed: July 29, 1976

[51] Int. Cl.² .................................... B27B 33/08
[52] U.S. Cl. .................................... 83/835; 83/676
[58] Field of Search .................. 83/676, 835, 855

[56] References Cited

U.S. PATENT DOCUMENTS

| 3,177,747 | 4/1965 | Elmes | 83/676 X |
| 3,938,417 | 2/1976 | Nedsten | 83/835 |

Primary Examiner—Willie G. Abercrombie

[57] ABSTRACT

This invention consists of a low noise circular disk blade having shallow peripheral gullets, said gullets being of a minimum radial depth whereby the sound generated by the blade's rotation is less than 90 decibels.

4 Claims, 4 Drawing Figures

CIRCULAR SAW HAVING REDUCED NOISE

BACKGROUND AND OBJECTIVES OF THE INVENTION

In recent years, more and more attention has been paid to the health, safety and welfare of production and factory employees. Federal and state legislators have pushed for more stringent safeguards concerning fire, air pollution and other health hazards. Noise pollution has also been investigated as a health hazard in causing ear damage and permanent hearing loss.

Federal and state regulatory agencies have now adopted noise level standards for various production facilities and shop and factory owners are required to maintain noise levels within particular guidelines as specified by the regulatory agencies.

Woodworking equipment used for production in furniture and other factories has for years posed problems for workers due to the excess noise and large sound volumes produced. Ear plugs are often required in many shops to combat the high noise level and many factory superintendants are hard pressed to keep the noise level within the new, regulatory standards.

Drill presses, planers, sanders and lathes contribute to the excess noise, but one of the most frequent and continuing sources of noise in woodworking or metal shops is the table or circular saw.

Circular saws are most frequently used and generally operate continually throughout the entire shift and, therefore, are a major contributor to the high sound or noise level in the production area of the factory.

With this background in mind, it is one of the objectives of this invention to produce a circular saw blade with maintains a reduced level of sound during work load cutting.

It is another objective of this invention to produce a relatively inexpensive low noise metal circular saw blade having carbide tips and shallow gullets.

It is yet another object of this invention to produce a circular saw blade that will produce a low volume of noise of less than 90 decibels during work load cutting.

DESCRIPTION OF THE DRAWINGS AND SUMMARY OF THE INVENTION

Figure 1:
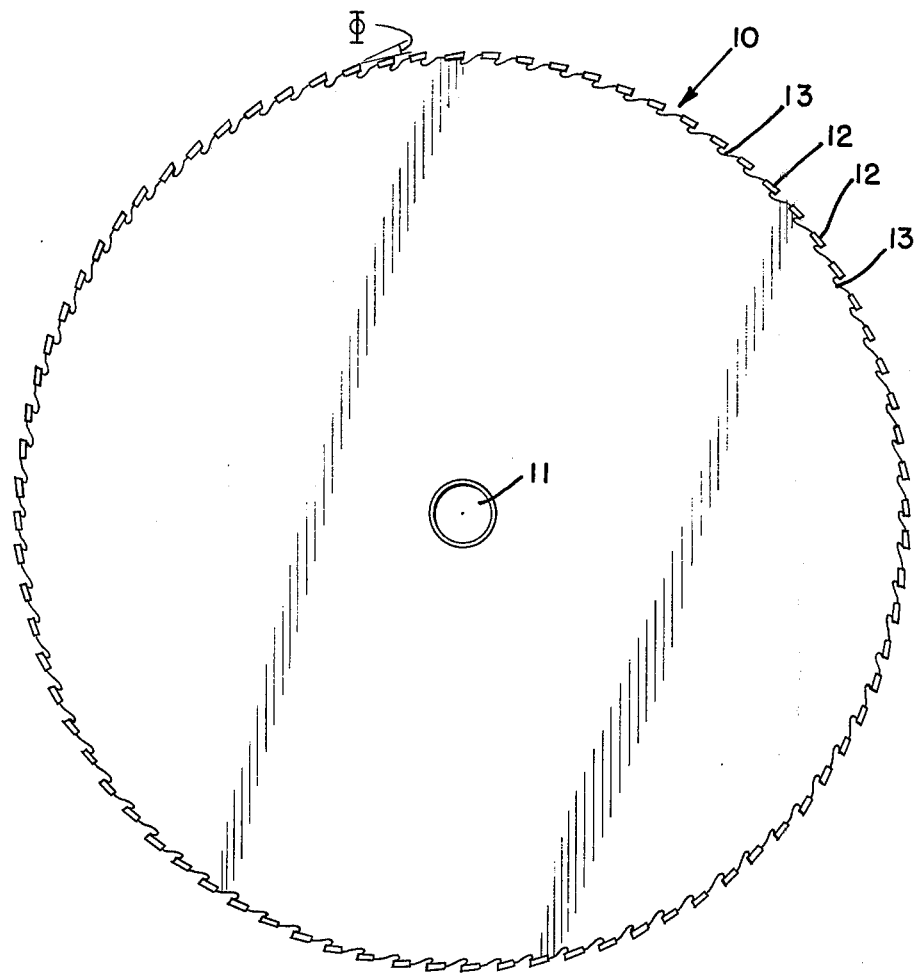
FIG. 1 is a side elevational view of a typical saw blade incorporating the inventive improvements.

The invention contained herein is an improvement in circular saw blades pertaining to the reduction and maintenance of low sound volumes during use. The saw blade shown in the drawings has a plurality of carbide tips which are on the periphery of the blade. Disposed between the tips of the blade are shallow gullets which aid in chip removal as the blade rotates. These gullets are radially shallow, that is, their depth when measured from the periphery to the center of the blade is only a fraction of an inch deep for a sixteen inch diameter blade. A shallow gullet is very effective in maintaining a low sound volume as the blade operates prior to the blade contacting the work and during the sawing operation when the blade is in contact with the work.

DETAILED DESCRIPTION OF THE INVENTION

FIG. 1 shows a side view of a circular saw blade made in accordance with the invention. Center arbor port 11 is shown for mounting blade 10 on a circular saw of conventional design. Carbide tips 12 are shown on the periphery of blade 10 which are designed to provide smoother cutting and longer blade life. Gullets 13 are shown disposed between carbide tips 12 and the shallow depth of the gullets 13 is displayed. Top angle phi ($\Phi$), known as the top clearance, is shown in FIG. 1 as the angle between the tangent to the blade and the top of the carbide tip.

Figure 2:
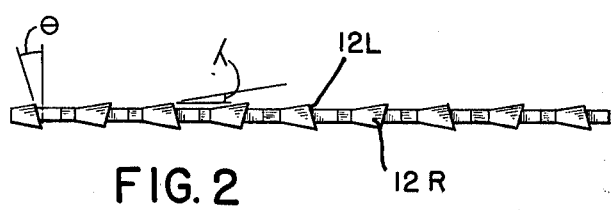
FIG. 2 is a top view of FIG. 1.

In FIG. 2, the carbide tips 12 are shown extending in part over the gullets with alternating left to right face bevels. Tip 12L is a left face bevel and tip 12R is a right face bevel. The face bevel angle is shown as angle theta ($\theta$), the angle between the perpendicular to the blade and the tip face. This angle has been found to work extremely satisfactorily at approximately 10 degrees. Also shown in FIG. 2 is angle lambda ($\lambda$). Lambda is the angle between the parallel to the side of the blade and the short side tip, referred to as "tangential clearance". Hence the circular saw blade has been found to effectively operate with angle lambda at approximately 1°–5°.

Figure 3:
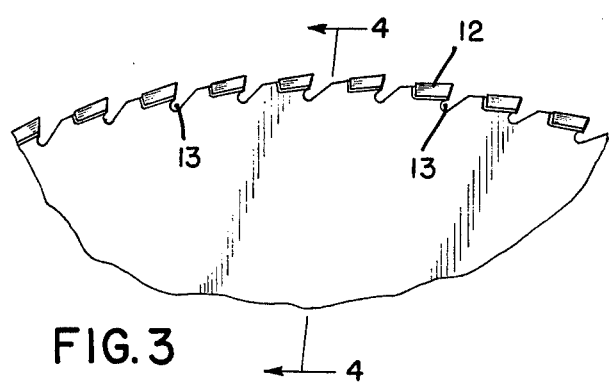
FIG. 3 is an enlarged fragmentary side elevational view.

In FIG. 3, carbide tips 12 are shown in an enlarged view and gullets 13 are displayed between carbide tips 12. Gullets 13 are very shallow and radially extended inward from the peripheral edge between 5/32 and 5/16 of an inch in depth for a saw having a diameter of sixteen inches. These shallow gullets greatly reduce the noise of the saw while it is rotating prior to contacting the work and after the cutting operation begins.

Figure 4:
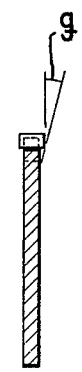
FIG. 4 is an end view of the left side of FIG. 3.

In FIG. 4, the radial angle gamma ($\gamma$) is shown. Gamma is measured at the outer most edge of the long side of the carbide tip 12 and this angle, known as the radial clearance, is approximately 0°–3° with optimum working angle being 2°.

While the exact theory of the low sound which is generated is not precisely known, the following explanation is suggested: As the blade 10 rotates at a high rate of speed during its cutting operation, carbide tips 12 cut the wood or other selected materials, and many of the cut chips pass from the tips 12 into the gullets 13 where they are quickly forced away from the blade 10 by other chips subsequently entering the gullets 13. Due to the low volume of materials such as wood chips or air which can be accomodated by the shallow gullets 13, a low volume of sound is maintained during the cutting operation.

Other designs and embodiments of the present invention can be conceived, but such changes or modifications remain within the intended scope of concept set forth herein.

I claim:

1. A circular metal saw blade for maintaining a reduced level of sound during work load cutting action comprising a circular disk having a central arbor port, said disk having a periphery with uniformly spaced shallow gullets therearound, each of said gullets having a radial depth of not more than 5/16 of an inch, a plurality of carbide tips secured to the disk periphery with one tip secured in juxtaposition to each gullet, each of said carbide tips extending a short distance circumferentially and extending forwardly over the deepest portion of said gullet, each of said tips having a tangential clearance of from 1° to 5° and from 0° to 3° radial clearance, and from 5° to 15° top clearance for a saw blade having a radius of 8 inches.

2. A circular metal saw blade as claimed in claim 1, wherein said gullets having a radial depth of 5/32 of an inch.

3. A circular metal saw blade as claimed in claim 1, wherein said tips have a tangential clearance of 5°, a radial clearance of 3° and 10° top clearance.

4. A circular metal saw blade as claimed in claim 1, each of said tips having a length greater than depth, the length of said tip extending circumferentially and the depth radially, said tip having a forward beveled cutting edge, said cutting edge extending at least partially across said gullet's deepest portion, said tip having a rearward portion of said beveled cutting edge extending forwardly of said deepest portion of said gullet.

* * * * *